(12) United States Patent
Thomson

(10) Patent No.: US 8,123,067 B2
(45) Date of Patent: Feb. 28, 2012

(54) STACKING PAN SET

(76) Inventor: Gavin Thomson, Richmond (GB)

(*) Notice: Subject to any disclaimer, the term of this patent is extended or adjusted under 35 U.S.C. 154(b) by 561 days.

(21) Appl. No.: 12/308,676

(22) PCT Filed: Jun. 25, 2007

(86) PCT No.: PCT/GB2007/002360
§ 371 (c)(1),
(2), (4) Date: Dec. 19, 2008

(87) PCT Pub. No.: WO2007/148123
PCT Pub. Date: Dec. 27, 2007

(65) Prior Publication Data
US 2010/0230319 A1 Sep. 16, 2010

(30) Foreign Application Priority Data
Jun. 24, 2006 (GB) .................... 0612548.8

(51) Int. Cl.
A47J 27/12 (2006.01)
B65D 21/028 (2006.01)
B65D 25/28 (2006.01)

(52) U.S. Cl. ............ 220/573.5; 220/756; 206/510

(58) Field of Classification Search .......... 206/546, 206/541; 73/426; D7/356, 354, 393; A47J 27/12
See application file for complete search history.

(56) References Cited

U.S. PATENT DOCUMENTS

| 109,739 | A | * | 11/1870 | Huntly | 229/120.01 |
|---|---|---|---|---|---|
| 836,983 | A | * | 11/1906 | Millwee | 99/425 |
| 1,268,017 | A | * | 5/1918 | Knight | 220/573.4 |
| 2,507,425 | A | * | 5/1950 | Swartout | 220/592.28 |
| 2,575,770 | A | * | 11/1951 | Roop | 206/514 |
| 3,526,138 | A | * | 9/1970 | Swett et al. | 73/426 |
| 4,951,832 | A | * | 8/1990 | Tenney et al. | 220/23.83 |
| 5,048,688 | A | * | 9/1991 | Hicks, Jr. | 206/501 |
| 5,184,745 | A | * | 2/1993 | Havens et al. | 220/23.83 |
| 5,769,229 | A | * | 6/1998 | Andress et al. | 206/505 |
| 5,992,308 | A | * | 11/1999 | Kroscher et al. | 99/422 |
| D440,164 | S | * | 4/2001 | Kerr | D10/46.3 |
| D450,605 | S | * | 11/2001 | Wright | D10/46.3 |
| 2002/0185012 | A1 | * | 12/2002 | Yokoyama | 99/413 |
| 2008/0017540 | A1 | * | 1/2008 | Sawhney et al. | 206/514 |

* cited by examiner

Primary Examiner — Mickey Yu
Assistant Examiner — Robert J Hicks
(74) Attorney, Agent, or Firm — Kirschstein, et al.

(57) ABSTRACT

The invention provides a set of cooking pans which nest completely one within the other, optionally together with their lids. Each pan of the set comprises a pan body ad a side handle, and the pan bodies are of progressively smaller diameter so that each pan body can be completely received within the next larger pan body for storage purposes, and each pan handle from the largest pan to at least the second smallest pan in the set is concave, creating along the top of that handle a longitudinal recess, each longitudinal recess communicating with a concavity in the top rim of the associated pan body so that when the body of a pan of smaller size is received in the pan body, the handle of the smaller pan extends through that concavity and is received wholly within the longitudinal recess in the handle of that next larger pan.

17 Claims, 10 Drawing Sheets

STACKING PAN SET

This invention relates to a set of inter-stacking cooking pans with integrated handles and preferably with accompanying lids. The pans may be of any conventional type used in the preparation and cooking of food, including saucepans, frying pans, skillets and casserole dishes each with one or two side handles, but the generic term "pan" will be used later in this specification for the sake of convenience.

BACKGROUND OF THE INVENTION

Pans are an essential part of food preparation and in particular to the cooking and heating of ingredients. There are many shapes and sizes of pan ranging from a large frying pan to a small 'milk' pan with many iterations in between. These pans conventionally have a vessel to contain a certain level or volume of ingredients combined with a handle to assist with cooking, lifting and pouring and normally an accompanying lid for heat retention during cooking. When the pans are not in use they have to be stored away. This has traditionally been achieved in a number of ways: by either hanging the pans by their handles; stacking one on top of another where the lids, sometimes turned upside down, provide a platform for the next pan to stack onto; stacking the pans into each other, starting with the largest first, where the pan vessel collides with the handle of the smaller pan tipping it up and where the lids have to be stored independently. These storage methods either use up a lot of space or they create an untidy solution.

If there could be a solution that accommodated the lids and created an economic use of space where one pan, even with a lid in place, stacked into the next and so on, in a similar manner to 'Russian dolls', then this could not only have commercial benefits for minimising shipping and retail space but also provide the consumer with a space saving and tidy solution.

THE INVENTION

The invention provides a set of pans as specified herein.

The largest pan of the set creates the outside envelope of the stacked set of pans. Preferably when the pans are stacked together for storage purposes all of the pan bodies of the smaller pans of the set, and all of their pan handles, are enclosed completely within that outside envelope. A localised rim recess may be formed in the top rim of each but the smallest pan of the set, sufficient to allow a proximal portion of the handle of the next smaller pan to pass through that rim recess while the body of the smaller pan is received completely within the body of the next larger pan. Alternatively the top rims may be of uniform height all around the perimeter of each pan.

The pans of the set preferably incorporate lids each of which has a lifting knob which has a recessed underside, the size of each recess being sufficient to receive therein the lifting knob of the lid of the next smaller pan of the set when the pans are stacked together one inside the other with their lids in place for storage purposes. The lids preferably have location details such as a peripheral depending flange to cause them to seat securely on the top rims of their associated pans. For pans with localised recesses in their top rims to allow the handles of the smaller pans to pass through the recess and over the top rim, the peripheral depending flange of the lid preferably has at least one discontinuity alignable with a localised recess in its pan top rim, sufficient to enable the flange to straddle the proximal portion or portions of the handle or handles when the pans are stacked one within the other with their lids in place for storage purposes.

If the pans have top rims of uniform height all around the perimeter of those top rims, and are provided with lids, then each pan lid except for the lid of the smallest pan of the set preferably has at least one edge recess formed therein to permit passage therethrough of a proximal portion of a handle of the next smaller pan in the set when the pans are stacked one within the other with their lids in place for storage purposes.

Preferably the handles of the nested pans of the set incorporate apertures by means of which the user can hang the pans in their stacked condition on a single hanging hook. Cooperating locating details in the interfitting handles, and cooperating locating details in the lids or alternatively internal magnets in the lids can make it easier to hang up the set of pans as a single stacked set without the pans separating and without the lids falling off.

DRAWINGS

DETAILED DESCRIPTION OF THE PREFERRED EMBODIMENTS

Figure 1:
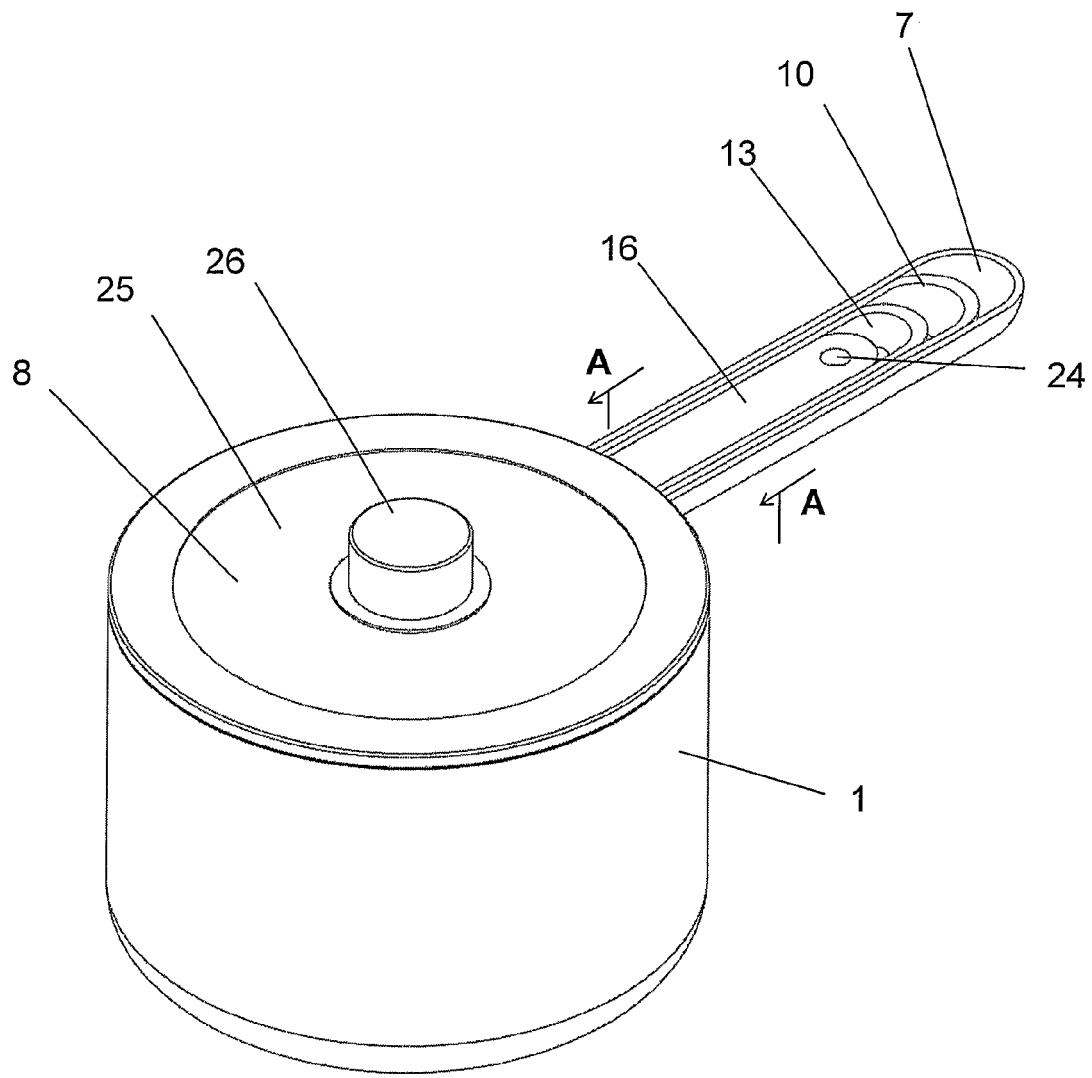
FIG. 1 is a perspective view of a set of pans according to the invention fully stacked.

Referring first to FIGS. 1 to 4 of the drawings, the complete pan set 1 includes a large pan and lid assembly 2, a medium pan and lid assembly 3, a small pan and lid assembly 4 and a smallest pan and lid assembly 5.

The large pan assembly 2 has a large vessel 6, a large handle 7 and large lid 8. The medium pan assembly 3 has a medium vessel 9, a medium handle 10 and a medium lid 11. The small pan assembly 3 has a small vessel 12, a small handle 13 and a small lid 14. The smallest pan assembly 5 has a smallest vessel 15, a smallest handle 16 and a smallest lid 17.

The large handle 7 has a location pin detail 18 and hanging detail 19. The medium handle 10 has a location pin detail 20 and hanging/location detail 21. The small handle 13 has a location pin detail 22 and hanging/location detail 23. The smallest handle 16 has a hanging/location detail 24.

Figure 3:
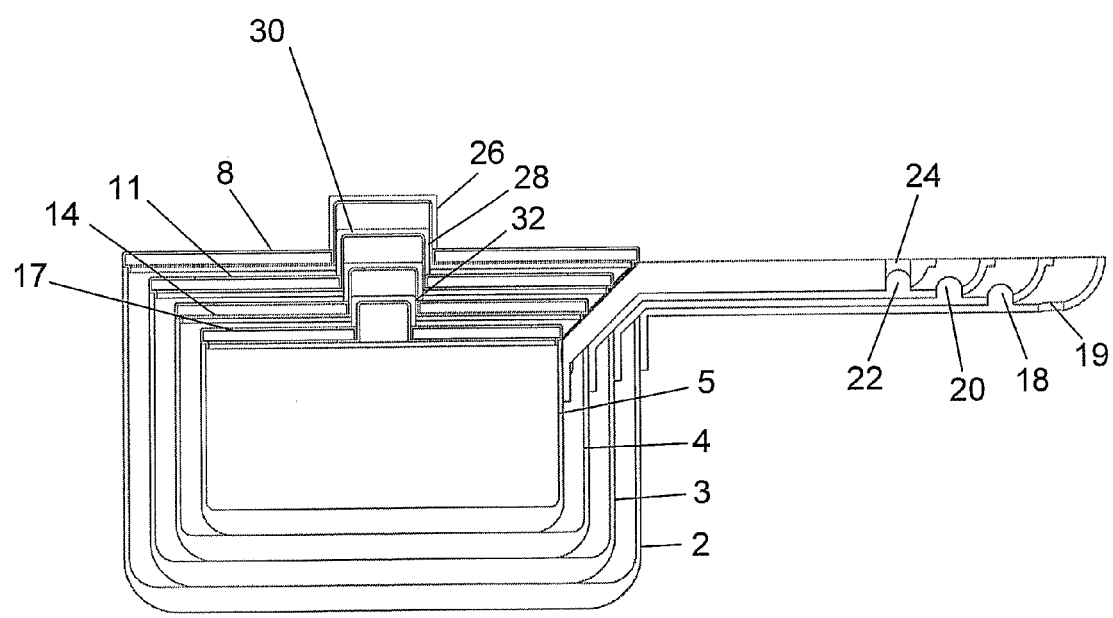
FIG. 3 is a vertical section through the stacked pans of FIG. 1.
Figure 4:
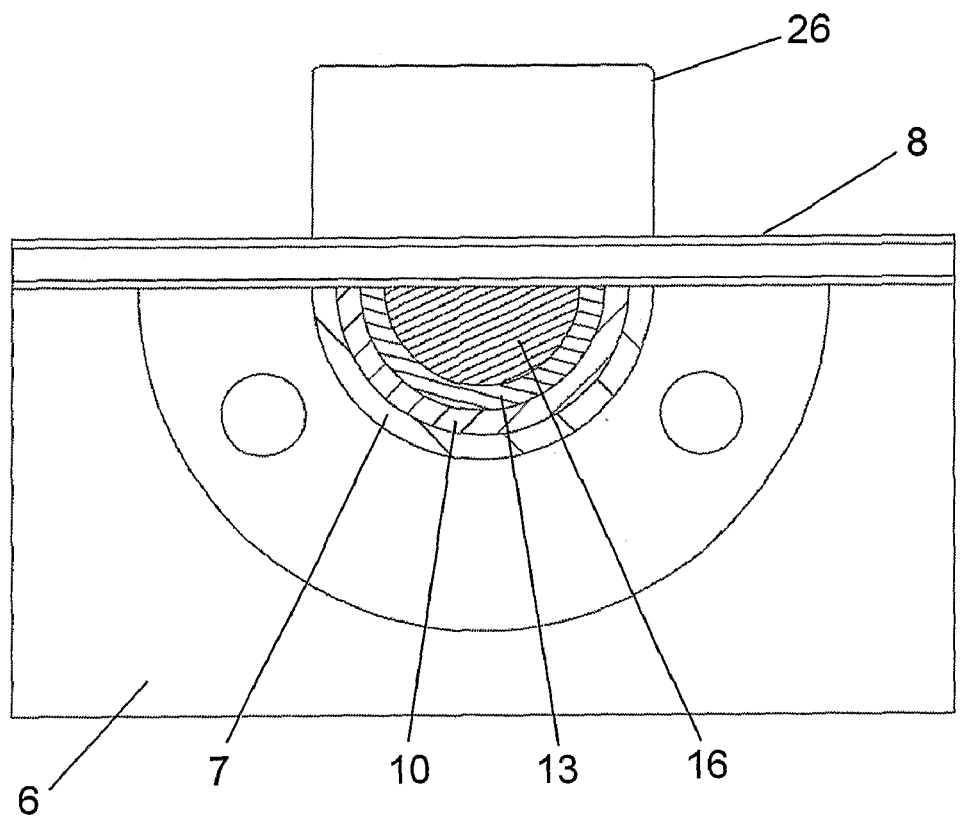
FIG. 4 is a section through the handles taken along the plane A-A of FIG. 1.
Figure 5:
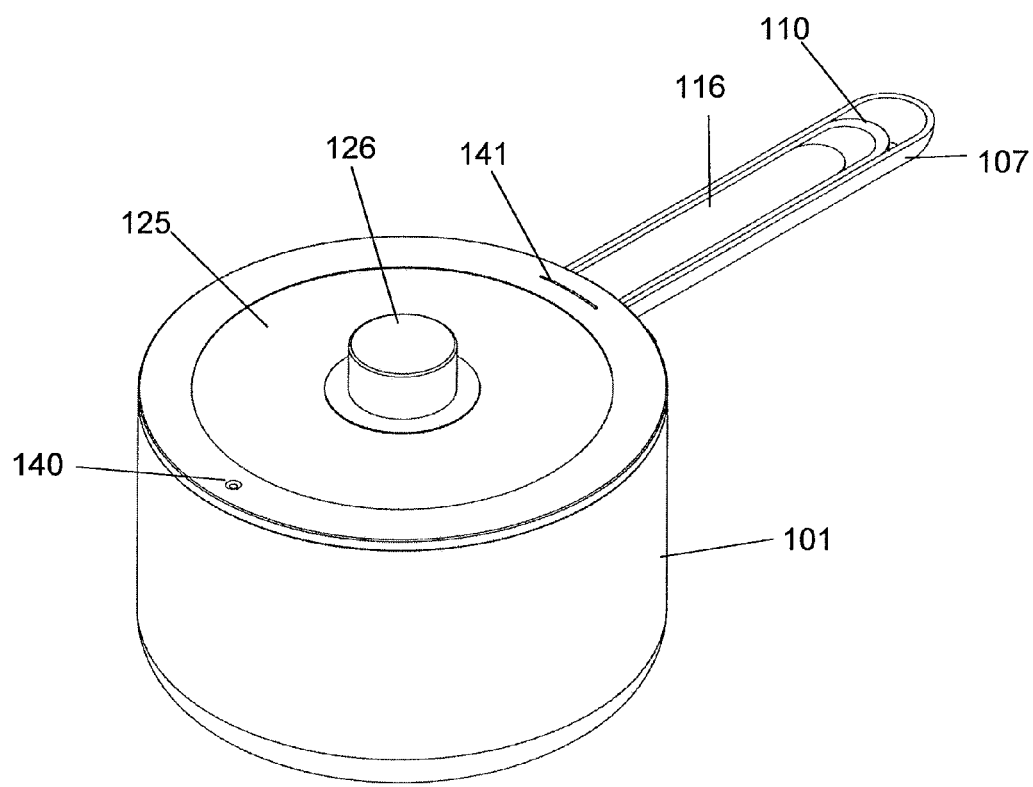
FIG. 5 is a perspective view similar to that of FIG. 1 but through another set of pans according to the invention fully stacked with slightly modified handles.

The large lid 8 comprises a cover disc 25 with a lifting knob 26. The medium lid 11 comprises a cover disc 27 and a lifting knob 28. The small lid 14 comprises a cover disc 29 and a lifting knob 30. The smallest lid 17 comprises a cover disc 31 and a lifting knob 32. The lids 8, 11, 14 and 17 may be made integrally with or separately from the lifting knobs 26, 28, 30 and 32. Each lifting knob has a hollow interior which receives completely the lifting knob of the next smaller lid in the set. Preferably the lids incorporate locating details to cause them to seat securely on the rims of their pans, lightly to hold the lids on the pans in conventional manner. In addition each pan lid may incorporate a magnet (not shown) which attracts the lid of the next smaller or larger pan lid when the lids are stacked together, which gives the user a reassuring 'feel' of accurate alignment when the lids are stacked together as shown in FIG. 3.

The smallest pan and lid assembly 5 stacks into the small vessel 12. The smallest handle 16 locates into the upwardly facing recess in the small handle 13 and is held in position by location details 22, 24. The small lid 14 is placed onto the small vessel 12 where the small lid lifting knob 30 interlocks with the smallest lid lifting knob 32. The small pan and lid assembly 4, preferably with smallest pan and lid assembly 5 stacked inside, stacks into the medium vessel 9. The small handle 13 locates into the upwardly facing recess in the medium handle 10 and is held in position by location details 20, 23. The medium lid 11 is placed onto the medium vessel 9 where the medium lid lifting knob 28 interlocks with the small lid lifting knob 30. The medium pan and lid assembly 3, preferably with small pan and lid assembly 4 and smallest pan and lid assembly 5 stacked inside, stacks into the large vessel 6. The medium handle 10 locates into the upwardly facing recess in the large handle 7 and is held in position by location details 18, 21. The large lid 8 is placed on the large vessel 6 where the large lid lifting knob 26 interlocks with the medium lid lifting knob 28.

Figure 2:
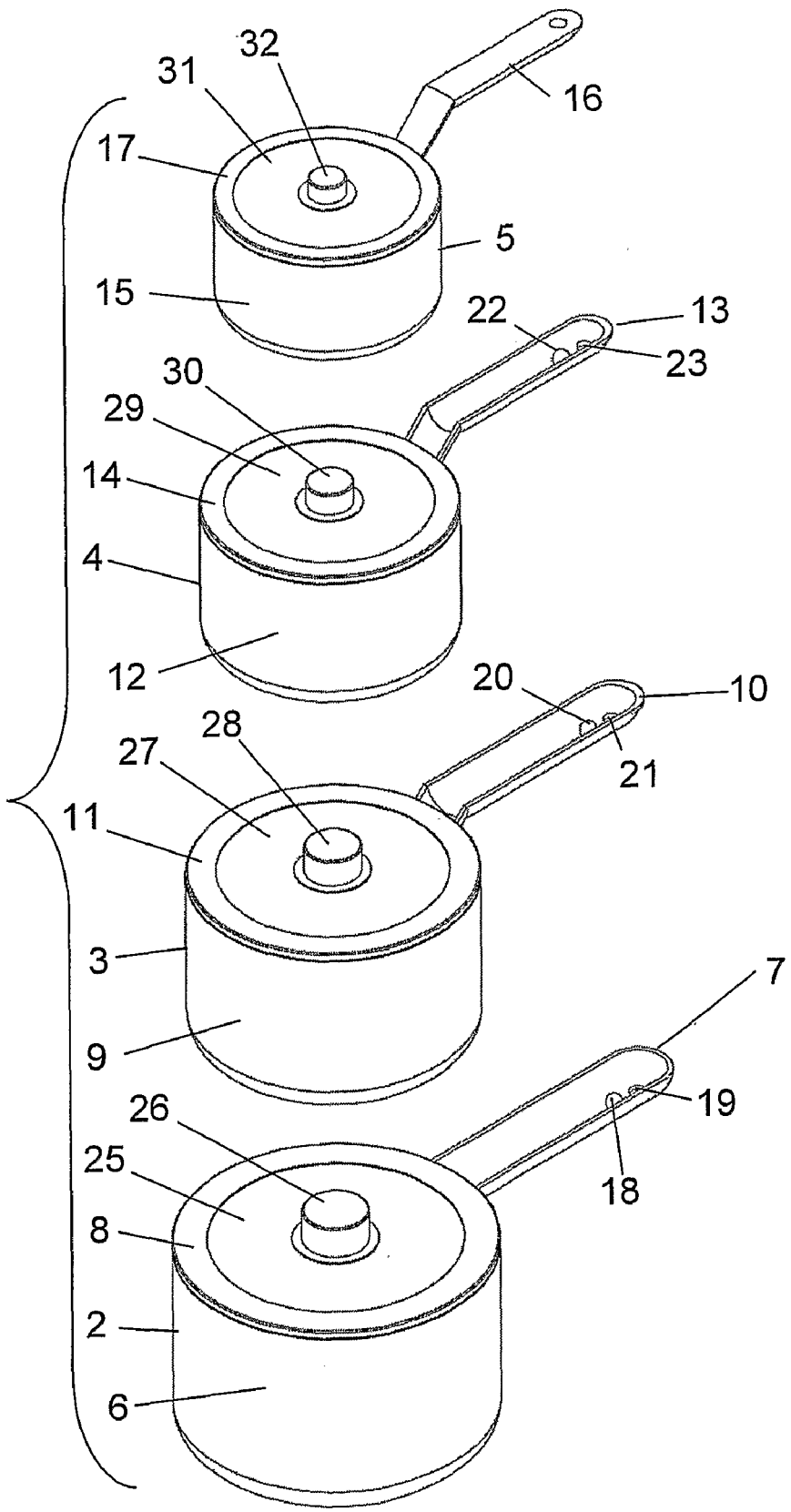
FIG. 2 is a perspective view of the separate pans of the set of FIG. 1, one above the other.
Figure 2A:
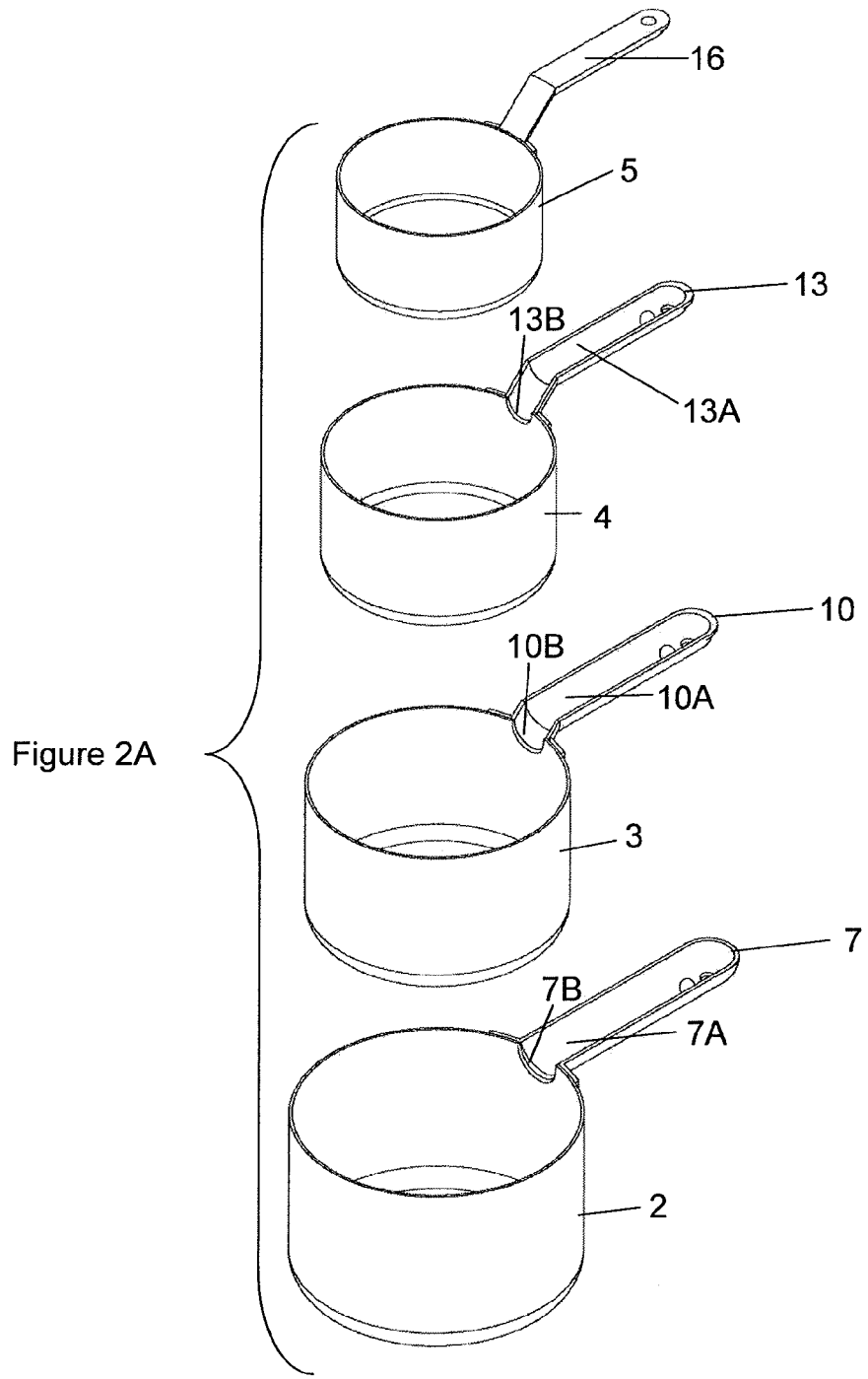
FIG. 2A is a perspective view similar to that of FIG. 2 but without the lids.

Shown most clearly in FIG. 2A (although also apparent from FIG. 3) is a detail of the design which enables the pans to nest together all within the envelope of the largest pan and lid assembly 2. The largest pan and lid assembly 2 has a handle 7 with an upwardly facing handle recess 7A extending the length of the handle from its distal end remote from the large vessel 6. Where the handle 7 is connected to the large vessel 6, the top rim of the large vessel 6 is formed with a rim recess 7B of the same size and shape as the inner surface of the recessed portion 7A of the handle 7. The rim recess 7B communicates with the upwardly facing handle recess 7A so that together they provide a space to accommodate the handle 10 of the next larger pan and lid assembly 3. Similarly a rim recess 10A and an upwardly facing handle recess 10B are formed in the pan and lid assembly 3, and a rim recess 13A and an upwardly facing handle recess 13B are formed in the pan and lid assembly 4. No rim recess and upwardly facing handle recess are formed in the pan and lid assembly 5 because when stacked there is no smaller pan to fit inside it.

The pan bodies of the smaller pan and lid assemblies 3, 4 and 5 of the set are progressively lower in their height to the top rim than the largest pan 6 in the set, and each of the handles 10, 13 and 16 of the smaller pans of the set has at its proximal end adjoining the associated pan body an upwardly inclined portion leading to the height of the rim recess 7B, 10B or 13B of the next larger pan of the set. Those inclined portions enable the smaller pans to sit flat inside the bodies of the larger pans as shown in FIG. 3, while the handles are brought to the same height to nest one within the next. Thus when the pans are stacked together the base of each pan except the largest pan in the set sits flat on the interior of the next larger pan in the set. The handle of each pan except the largest pan in the set is received in the upwardly facing handle recess in the handle of the next larger pan in the set.

The pans can be stacked together as described above even when the lids 8, 11, 14 and 17 are in place, as shown in FIG. 3.

It will be understood that the concave shape of the pan handles creates the location profile which provides positive location of the handles so that the conjoined handles can be used to lift the stacked pans as a set. Other shapes may be used. For example the pan handles (apart possibly from the largest pan in the set) may be convex in shape, with that convexity creating the location profile and establishing along the bottom of each handle a recess which receives wholly or partially the handle of the next larger pan in the set when the pans are stacked together for storage purposes.

FIGS. 5 to 8 show a slightly modified pan set. Where appropriate similar reference numerals have been used in FIGS. 5 to 8 to identify analogous components and features, although the reference numerals in FIGS. 5 to 8 have been increased by 100.

There are only three pans in the second set 101 of pans as illustrated in FIGS. 5 to 8. These consist of a largest pan comprising a pan body 106 and a handle 107; an intermediate sized pan comprising a pan body 109 and a handle 110, and a smallest pan comprising a pan body 115 and a handle 116. The handles 107, 110 and 116 differ from the handles 7, 10 and 16 of the pans of the first set in that at the proximal ends of the handles 107 and 110, where the handles join onto the pan bodies, the upwardly facing handle recesses 107A and 110A of those handles have portions 107C and 110C of lesser depth, to create weirs for discouraging the flow of liquid such as condensed steam along the remainder of the upwardly facing handle recesses when the pans are in use. The smallest pan 115 in the set has a handle 116 with a correspondingly reduced thickness portion 116C to permit that handle to fit into the upwardly facing handle recess 110A of the intermediate sized pan 109.

Figure 6:
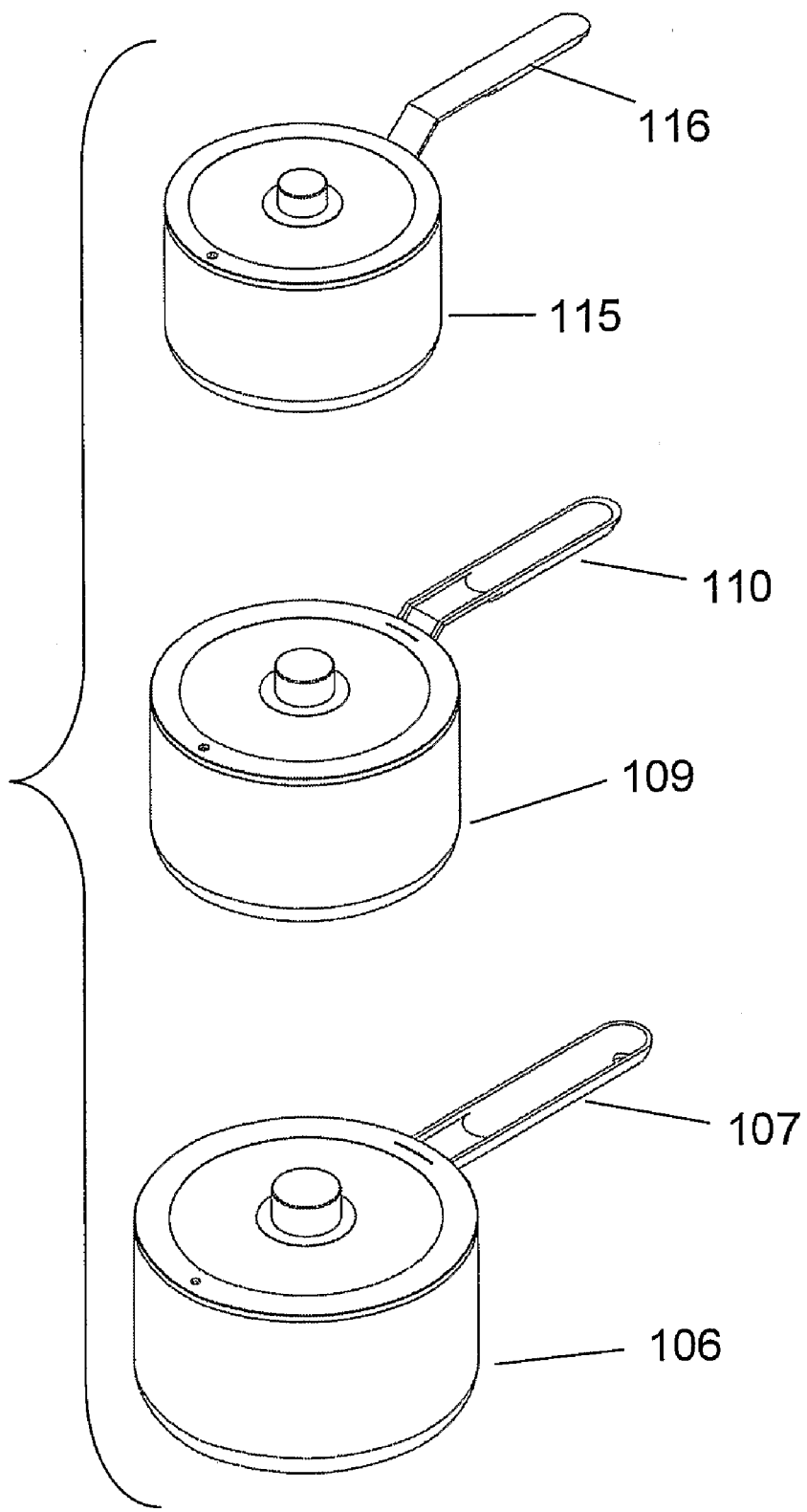
FIG. 6 is a perspective view similar to that of FIG. 2 but through the pan set of FIG. 5.
Figure 6A:
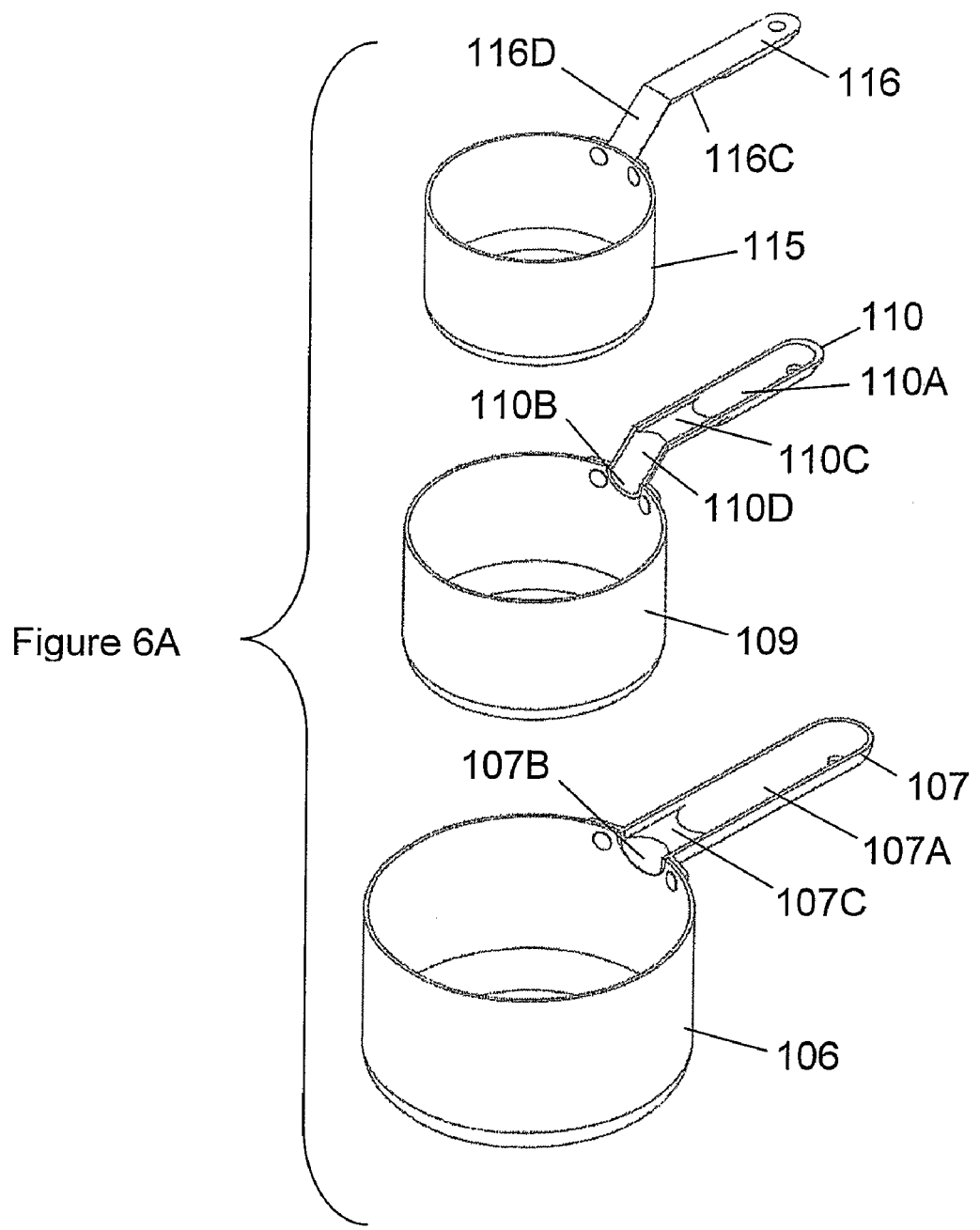
FIG. 6A is a perspective view similar to that of FIG. 6 but without the lids.

As with the first pan set of FIGS. 1 to 4, each of the handles 110 and 116 of the smaller pans of the set has at its proximal end an upwardly inclined portion leading to the height of the rim recess 107B or 110B of the next larger pan of the set. In FIG. 6A those inclined portions have been given the reference numerals 110D and 116D.

The lids of the three pans of the second set have a number of features not present in the lids of the pans of the first set. Each lid has a vent hole 140 (see FIGS. 5 and 7). Also the lids of the two larger pans have markings 141 the purpose of which is described below. Each lid comprises a cover disc 125 with a lifting knob 126, exactly as described with reference to the lid of the largest pan in the first set, but for all three pans of the second set the cover plate comprises a flat disc of toughened glass 142 (see FIG. 7) bordered by a metal pressing which is deep drawn into a retaining flange 143. The retaining flange 143 is deeper than the flanges of the pan lids of the first set, and includes an inclined portion 144 which is a discontinuity in the otherwise uniform depending flange around the lid, designed to straddle the inclined portion 110D or 116D of the handle of the next smaller pan when the pans are stacked together. The marking 141, referred to above, provides the user with a visual guide for aligning the lids as the pans are stacked together as shown in FIG. 7.

Each retaining flange 143 is preferably deep enough to cover completely the rim recess 107B or 110B of its associated pan, which gives the user some additional control over the venting of steam during cooking. If the lid is rotated so that the flange 143 covers that rim recess, then there is no escape of steam through that rim recess, and that is usually desirable because such a lid alignment prevents the issuance of steam directly against the handle and the position where a user's hand could potentially be. A slight rotation of the lid from that alignment, however, permits additional venting of the steam which may occasionally be desirable but is in any case under the control of the user.

Figure 7:
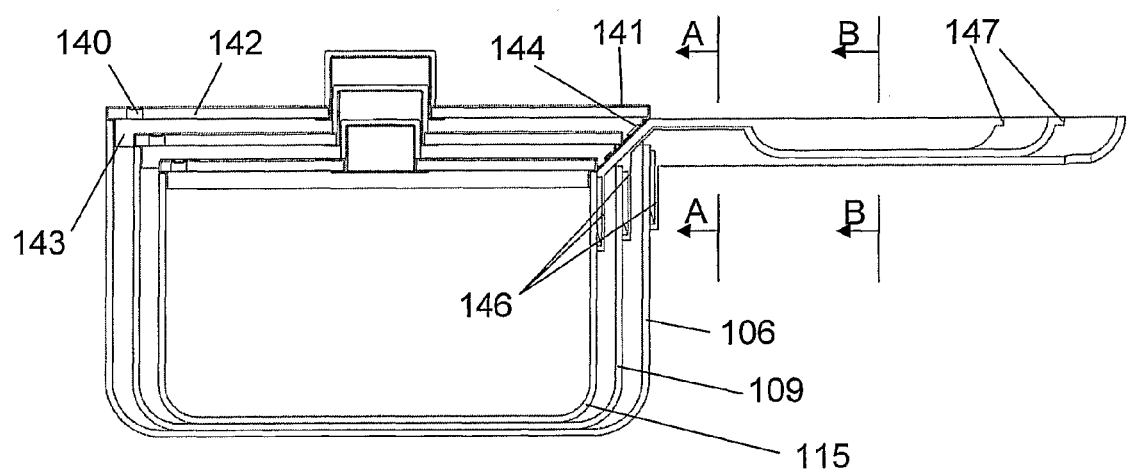
FIG. 7 is a vertical section similar to that of FIG. 3 but through the stacked pans of FIG. 5.
Figure 8A:
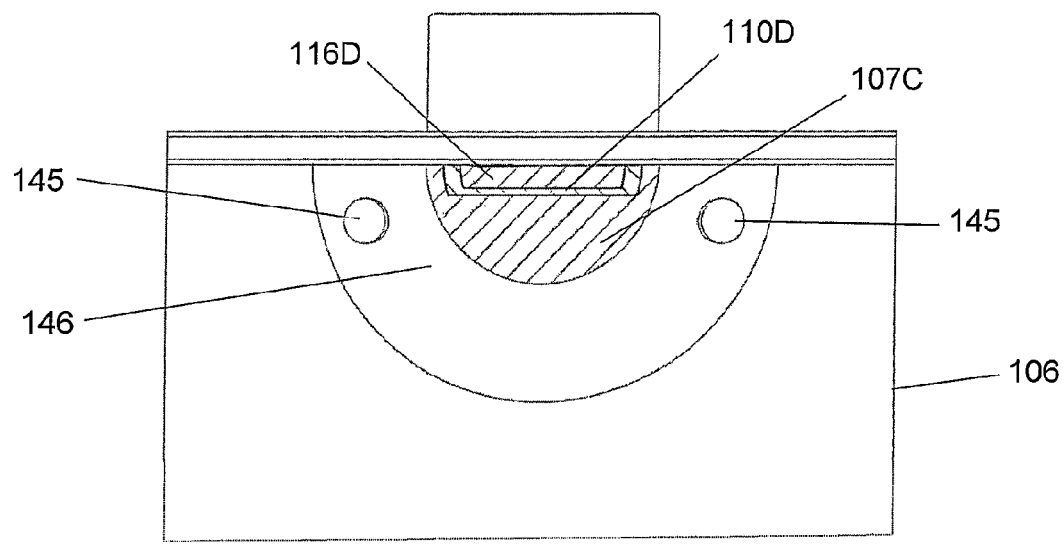
FIG. 8A is a section through the handles taken along the plane A-A of FIG. 7.
Figure 8B:
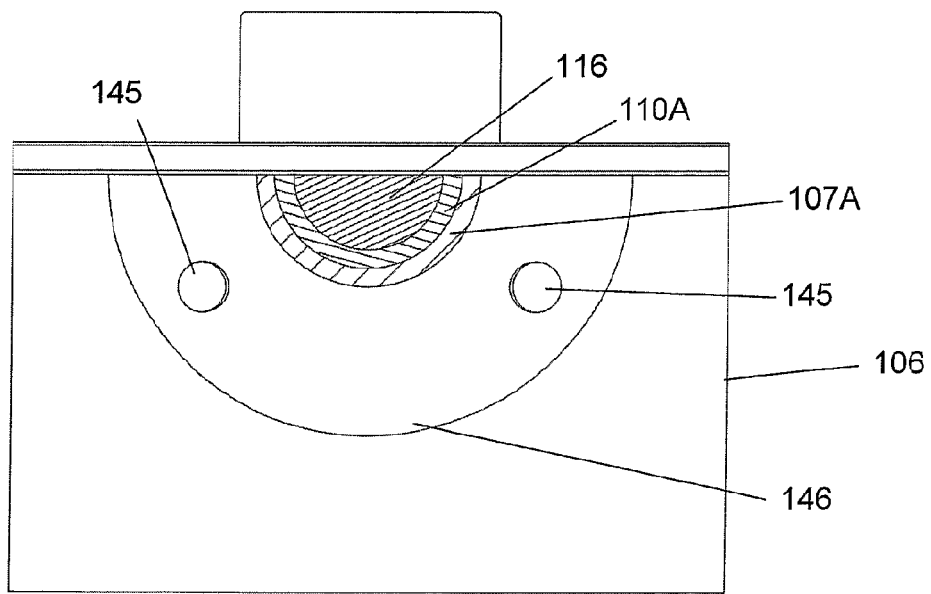
FIG. 8B is a section through the handles taken along the plane B-B of FIG. 7.

Another feature of this second embodiment is apparent from FIG. 7. The method of securing the handles to the pans is not shown in FIG. 7, as that plays no part in the invention and any conventional fixing means such as rivets may be used. However FIGS. 8A and 8B show, for illustrative purposes only, the heads of two rivets 145 passing through a generally semicircular flange portion 146 of the handle 107 of the largest pan of the set. Each pan has a similar flange portion 146, and those flange portions 146 are shown in FIG. 7 and can be seen to be spaced slightly from the outer wall of the vessel body of each pan of the set, providing a double wall with an air gap between each pan vessel body and its associated handle. The spacing is provided by a peripheral flange around the edge of each semicircular flange portion 146. The air gap creates a degree of thermal isolation between each pan body and its associated handle.

Finally it will be observed from FIG. 7 that at the distal end of each handle except that of the largest pan, the handle is formed with a short spur 147 extending beyond the end of the remainder of the handle 107 or 110. That short spur 147 is important to allow the user to lift a smaller pan out from its next larger pan when separating the pans of the set prior to cooking. The user's finger can locate beneath the short spur, enabling the smaller of a pair of nested pans to be lifted free.

The invention claimed is:

1. A cooking pan set, comprising:
a plurality of cooking pans each including a pan body with a base, an upper rim and at least one handle,
wherein the pan bodies are of progressively smaller diameter and height and are stacked, one within the other, for storage purposes,
and, when so stacked, each pan body is completely received within a next larger pan body with its base parallel to the base of the next larger pan, with each pan handle from a smallest pan to a second largest pan in the set extending over the upper rim of the next larger pan in the set, closely to overlie a corresponding handle of the next larger pan in the set,
and wherein each handle is provided with a location profile so that, when a handle closely overlies a corresponding handle of the next larger pan in the set, the two overlying handles locate together as one so that the so located handles are used to lift the stacked pans of the set.

2. The cooking pan set according to claim 1, wherein each of the handles of the smaller pans of the set has at its proximal end adjoining the associated pan body an upwardly inclined portion raising the handle above the height of the upper rim of the next larger pan of the set.

3. The cooking pan set according to claim 1, wherein the upper rim of each pan of the set, except for the smallest pan, is provided with at least one localized recess of lower height than the remainder of that upper rim, each localized recess permitting a handle of a smaller pan in the set to pass through that localized recess as it passes over the upper rim of the larger pan when the pans are stacked, one within the other, for storage purposes.

4. The cooking pan set according to claim 3, wherein each pan has a pan lid with a lifting knob which has a recessed underside, the size of each lifting knob recess being sufficient to receive therein the lifting knob of the lid of the next smaller pan of the set when the pans are stacked, one within the other, with their lids in place for storage purposes.

5. The cooking pan set according to claim 4, wherein the pan lids have location details to cause them to seat securely on the top upper rims of their pans.

6. The cooking pan set according to claim 5, wherein the location details comprise a peripheral depending flange around an edge of each of the pan lids for engagement inside the upper rim of the correspondingly sized pan of the set, and at least one discontinuity in the depending flange alignable with the localized recess in the upper rim of that correspondingly sized pan of the set, the discontinuity being sufficient to enable the flange to straddle the proximal portion of a handle or the proximal portions of the handles of the next smaller pan of the set when the pans are stacked, one within the other, for storage purposes.

7. The cooking pan set according to claim 1, wherein the upper rim of each pan is of an even height all around a perimeter of the pan.

8. The cooking pan set according to claim 7, wherein each pan has a pan lid with a lifting knob which has a recessed underside, the size of each lifting knob recess being sufficient to receive therein the lifting knob of the lid of the next smaller pan of the set when the pans are stacked, one within the other, with their lids in place for storage purposes; and each pan lid, except for the lid of the smallest pan of the set, has at least one edge recess formed therein to permit passage therethrough of a proximal portion of a handle of the next smaller pan in the set when the pans are stacked, one within the other, with their lids in place for storage purposes.

9. The cooking pan set according to claim 4, wherein each pan lid incorporates a magnet which attracts the lid of the next stacked pan when the lids are stacked together, lightly to hold the lids together.

10. The cooking pan set according to claim 3, wherein the upper rim of each pan of the set, except for the smallest pan, is provided with at least one localized recess of lower height than the remainder of that upper rim, each localized recess permitting a handle of a smaller pan in the set to pass through that localized recess as it passes over the upper rim of the larger pan when the pans are stacked, one within the other, for storage purposes.

11. The cooking pan set according to claim 10, wherein each pan has a pan lid with a lifting knob which has a recessed underside, the size of each lifting knob recess being sufficient to receive therein the lifting knob of the lid of the next smaller pan of the set when the pans are stacked, one within the other, with their lids in place for storage purposes.

12. The cooking pan set according to claim 11, wherein the pan lids have location details to cause them to seat securely on the top upper rims of their pans.

13. The cooking pan set according to claim 12, wherein the location details comprise a peripheral depending flange around an edge of each of the pan lids for engagement inside the upper rim of the correspondingly sized pan of the set, and at least one discontinuity in the depending flange alignable with the localized recess in the upper rim of that correspondingly sized pan of the set, the discontinuity being sufficient to enable the flange to straddle the proximal portion of a handle or the proximal portions of the handles of the next smaller pan of the set when the pans are stacked, one within the other, for storage purposes.

14. The cooking pan set according to claim 11, wherein each pan lid incorporates a magnet which attracts the lid of the next stacked pan when the lids are stacked together, lightly to hold the lids together.

15. The cooking pan set according to claim 1, wherein the location profiles of the handles include location details to cause the handles releasably to clip together when the pans are stacked, one within the other, for storage purposes.

16. The cooking pan set according claim 1, wherein each pan handle from the largest pan in the set to the second smallest is at least partially concave, that concavity creating the location profile by establishing along a top of that handle a recess which receives at least partially the handle of the next smaller pan in the set when the pans are stacked together, one within the other, for storage purposes.

17. The cooking pan set according to claim 1, wherein each pan handle from the second largest pan in the set to the smallest is at least partially convex, that convexity creating the location profile by establishing along a bottom of that handle a recess which receives at least partially the handle of the next larger pan in the set when the pans are stacked together, one within the other, for storage purposes.

* * * * *